(12) United States Patent
Götz

(10) Patent No.: US 6,315,347 B1
(45) Date of Patent: Nov. 13, 2001

(54) CENTER CONSOLE CROSS MEMBER IN A MOTOR VEHICLE AND METHOD OF MAKING SAME

(75) Inventor: Erwin Götz, Weil der Stadt (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 09/592,269

(22) Filed: Jun. 12, 2000

(30) Foreign Application Priority Data

Jun. 11, 1999 (DE) ............................................. 199 26 636

(51) Int. Cl.$^7$ .................................................. B62D 25/14
(52) U.S. Cl. ........................................ 296/72; 296/203.02
(58) Field of Search ............................... 296/70, 72, 194, 296/203.02; 180/90; 280/728.2, 732, 779, 752

(56) References Cited

U.S. PATENT DOCUMENTS

| | | | |
|---|---|---|---|
| 5,282,637 | * | 2/1994 | McCreadie ........................ 296/203 |
| 5,868,426 | * | 2/1999 | Edwards et al. .................. 280/779 |
| 5,931,520 | * | 8/1999 | Seksaria et al. .................. 296/70 |
| 5,934,733 | * | 8/1999 | Manwaring ....................... 296/72 |
| 6,139,082 | * | 10/2000 | Davis, Jr. et al. ................ 296/72 |
| 6,176,544 | * | 1/2001 | Seksaria et al. ................ 296/203.02 |

FOREIGN PATENT DOCUMENTS

2667038 A1   3/1992   (FR) .
WO-99/10219  *  3/1999   (WO) .

* cited by examiner

Primary Examiner—Stephen T. Gordon
Assistant Examiner—Patricia Engle
(74) Attorney, Agent, or Firm—Crowell & Moring LLP

(57) ABSTRACT

A center console cross member in a vehicle is aligned in a forward structure at a level of an instrument panel in a transverse direction of the vehicle. The cross member is fastened by one end respectively on opposite vehicle body parts of the motor vehicle. The center console cross member includes a tube-shaped basic member, on which at least one holding element for mounting vehicle function elements, and lateral fastening consoles are mounted. For providing a center console cross member, which, while its construction is simple, can be used for several different vehicles of a vehicle family and by means of which large tolerances can be compensated, it is provided that, onto a basic member of a defined length, one or several holding elements and the two lateral fastening consoles can be slid and can be fixed in the intended position by clamping fastenings, the holding elements and the fastening consoles almost completely enclosing the basic member in areas.

36 Claims, 3 Drawing Sheets

US 6,315,347 B1

CENTER CONSOLE CROSS MEMBER IN A MOTOR VEHICLE AND METHOD OF MAKING SAME

BACKGROUND AND SUMMARY OF THE INVENTION

This application claims the priority of German Application No. 199 26 636.0, filed Jun. 11, 1999, the disclosure of which is expressly incorporated by reference herein.

The invention relates to a center console cross member in a motor vehicle which, aligned in the forward structure at the level of an instrument panel in the transverse direction of the vehicle, is fastened by means of one end respectively on the opposite vehicle body parts.

From French Patent Document FR 2 667 038 A1, a center console cross member for a motor vehicle is known which is composed of a transversely extending tube-type basic member, at least one holding element is connected with the latter for the linking of vehicle function elements and lateral fastening consoles. The at least one holding element and the fastening consoles are welded to the basic member. Because of the large number of weld seams, such a center console cross member has a construction requiring relatively high expenditures. It is also difficult to maintain narrow tolerances with respect to adjoining vehicle body parts. Because of the butt-jointed lateral fastening consoles, such a center console cross member system is suitable only for a single vehicle type with a defined width of the interior.

It is an object of the invention to further develop a center console cross member such that, while its construction is simple, it can be used for several vehicles of one vehicle family with different widths of the interior, and that, in addition, relatively large tolerances can be compensated.

This object is achieved by providing an arrangement with a center console cross member in a motor vehicle, which, aligned in the forward structure at the level of an instrument panel in the transverse direction of the vehicle, is fastened by means of one end respectively on the opposite vehicle body parts of the motor vehicle, the center console cross member comprising a tube-shaped basic member, on which at least one holding element for mounting vehicle function elements, and lateral fastening consoles are mounted, wherein at least one holding element and two lateral fastening consoles can be slid onto the basic member of a defined length and can be fixed in an intended use position by clamping fastenings, the holding elements and the fastening consoles almost completely enclosing the basic member in areas.

Principal advantages achieved by means of the invention are that the center console cross member system according to the invention can be universally used and rapidly and easily manufactured and mounted.

The center console cross member system comprises a tube-shaped basic member of a defined length, onto which one or several holding elements can be pushed for linking vehicle function elements and laterally exterior fastening consoles, in which case the holding elements and the fastening consoles each includes a cylindrical recess which in use encloses a major part of the circumference of the cylindrical recesses and can be fixed in the respective designed position by means of clamping fastenings. Thus, by means of a minimum of components, center console cross members can be produced which can be used in a large number of vehicles with different widths of the interior.

Other objects, advantages and novel features of the present invention will become apparent from the following detailed description of the invention when considered in conjunction with the accompanying drawings.

DETAILED DESCRIPTION OF THE DRAWINGS

Figure 1:
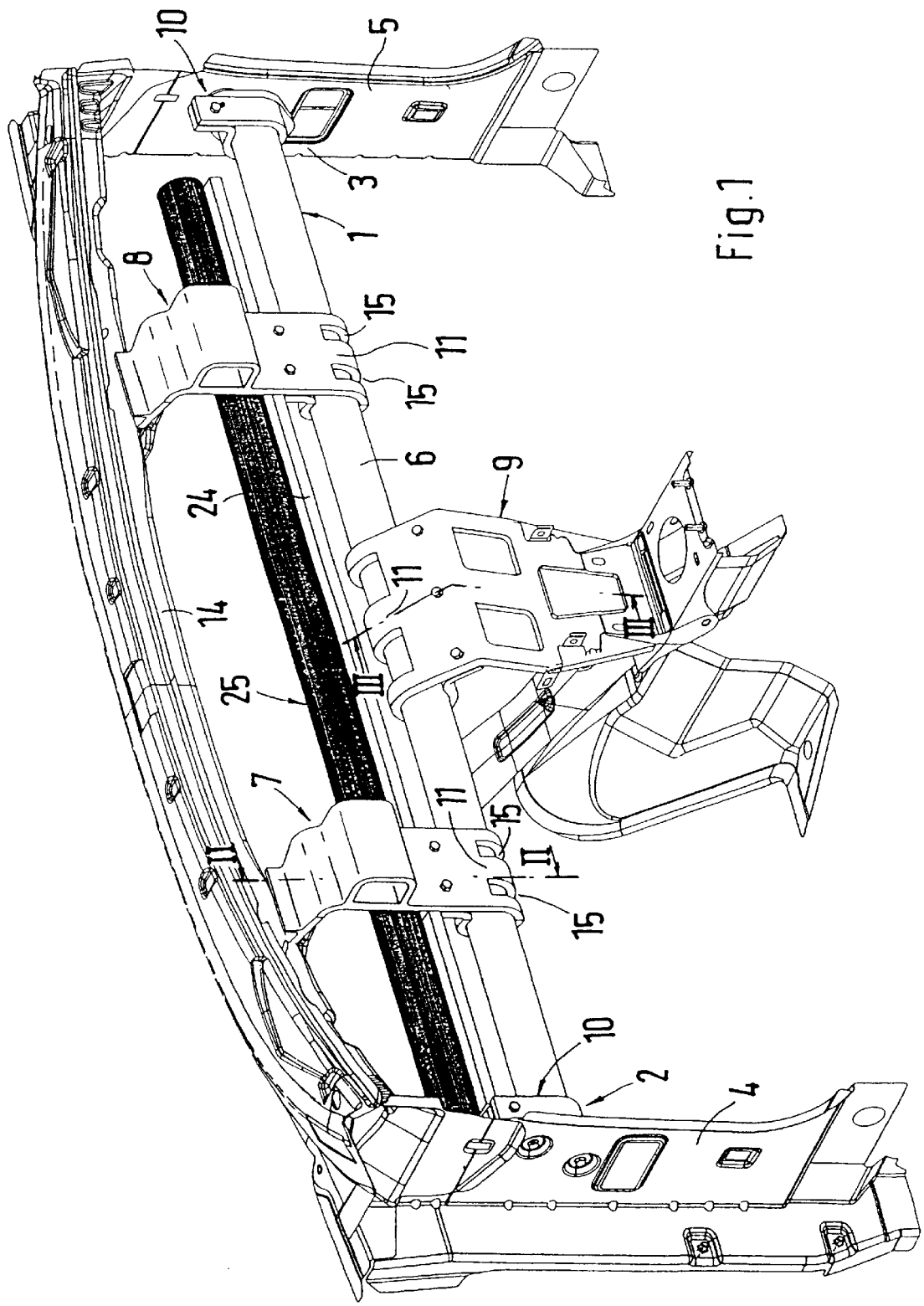
FIG. 1 is a perspective view of a center console cross member according to the invention with the adjoining vehicle body parts.

FIG. 1 shows a center console cross member 1 in a motor vehicle which is not shown in detail and which, aligned in the forward structure at the level of an instrument panel in the transverse direction of the vehicle, is fastened by means of one end 2 and 3 respectively on the opposite vehicle body parts 4, 5 of the motor vehicle, for example, by a screwed connection.

In the embodiment shown, the vehicle body parts 4, 5 are formed by opposite upright A-columns of the motor vehicle. The center console cross member 1 comprises a transversely extending tube-type basic member 6, on which at least one holding element 7, 8, 9 for installing vehicle function elements and lateral fastening consoles 10 are mounted.

The basic member 6, which is made of steel or a light-metal alloy and preferably has a circular-ring-shaped cross-section, is in each case cut to the corresponding length for different vehicles of a vehicle family.

Figure 2:
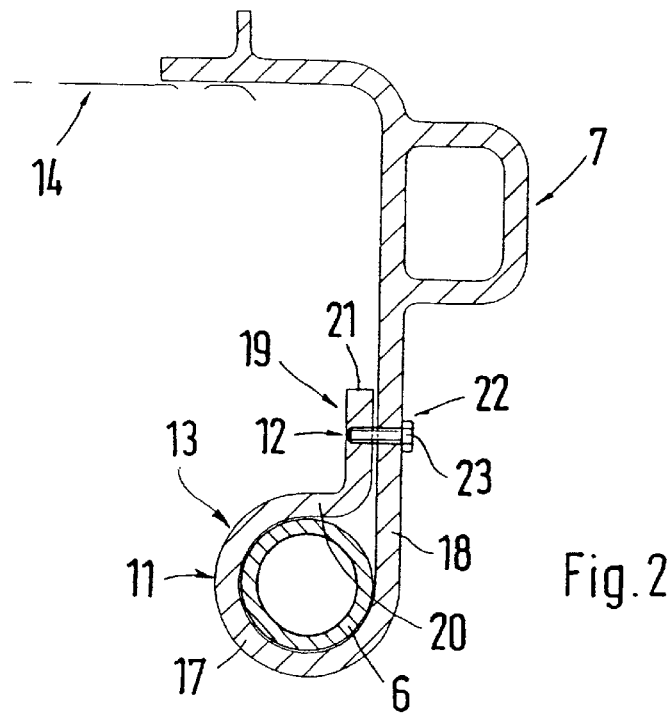
FIG. 2 is a sectional view taken along Line II—II of FIG. 1.
Figure 3:
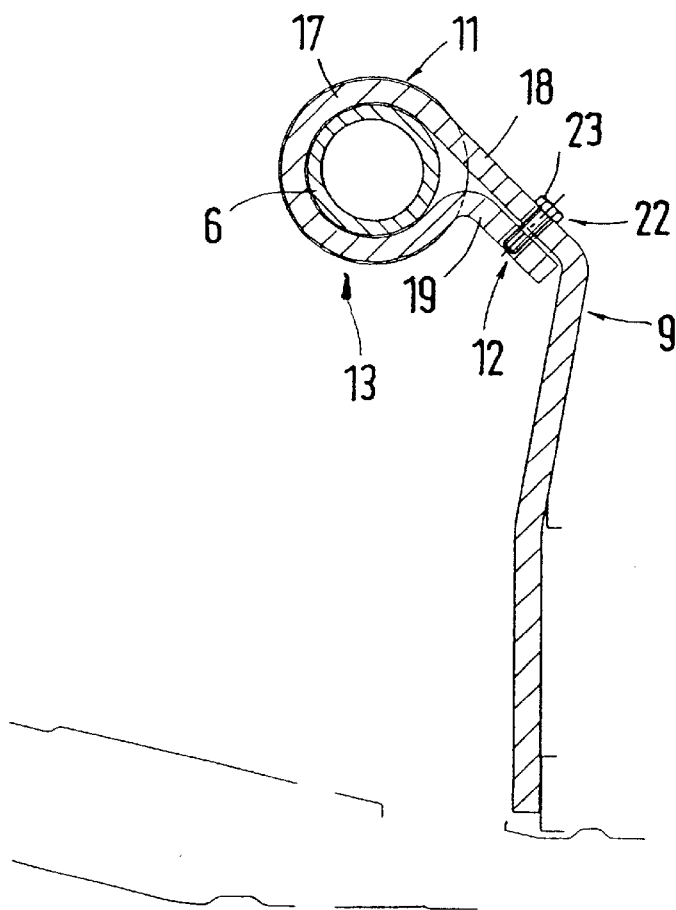
FIG. 3 is a sectional view taken along Line III—III of FIG. 1.

According to the invention, the at least one holding element 7, 8, 9 and the two lateral fastening consoles 10 each have a transversely extending receiving device 11 for the almost complete enclosing of the interior basic member 6, in which case the holding elements 7, 8, 9 and fastening consoles 10 pushed onto the basic member 6 from the side can be fixed by way of releasable clamping fastenings 12 on the basic member (FIGS. 2 and 3).

The transversely extending receiving devices 11 are constructed on the end areas 13, which face the basic member 6, of the holding elements 7, 8, 9 and of the fastening consoles 10 facing the basic member, and are preferably constructed in one piece with the above-mentioned components. The holding elements 7, 8, 9 and the fastening consoles 10 can be formed by sheet metal parts, extruded profiles or the like. Along its longitudinal course, the basic member 6 may have a uniform cross-section or a different cross-section (for example, by means of internal-high pressure forming processes).

In the embodiment shown, a first holding element 7 is provided for connecting a steering column, a second holding element 8 is provided for a front passenger air bag, and a third holding element 9 is provided for the connection on the floor or the transmission tunnel of the vehicle body. The two upward-projecting holding elements 7, 8 are connected by means of their upper end on a transverse member 14 (cowl) fixedly standing on the vehicle body side and can be fastened to the cross member 14. Each transversely extending receiving device 11 may have locally recessed areas 15.

Figure 4:
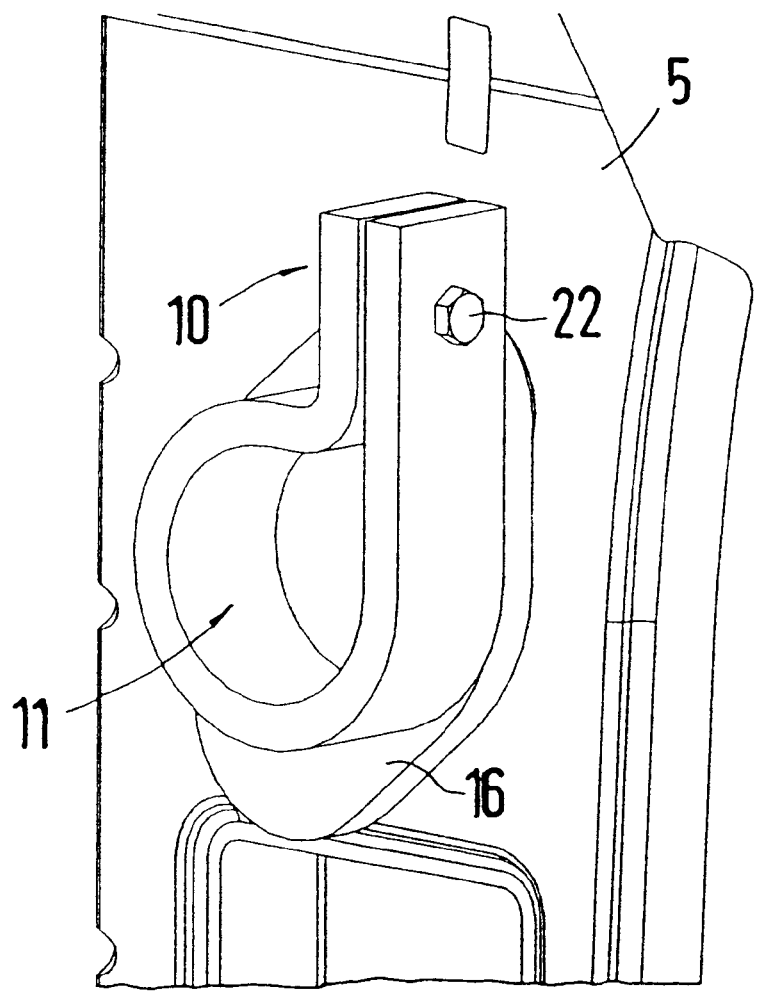
FIG. 4 is a perspective view of an outer fastening console for the center console cross member.

Each fastening console 10 is composed of a transversely extending receiving device 11, which is open toward the vehicle center, and of an exterior fastening plate 16, passage bores for a guiding-through of transversely extending, not shown fastening screws being constructed on each fastening plate 16 (FIG. 4).

The transversely extending receiving devices 11 of the fastening consoles 10 each receive a laterally exterior edge area of the basic member 6, between the receiving device 11 and the edge area of the basic member 6, an overlapping taking place in the transverse direction of the vehicle. By a different overlapping, tolerances can be compensated in the transverse direction of the vehicle.

In the cross-sectional view, each transversely extending receiving device 11 is composed of a circle segment 17 of approximately 270° and two flanges 18, 19 which are connected to the circle segment 17 and which extend in sections in parallel and at a small distance from one another. A first linear flange 18 is tangentially connected to an end of the circle segment 17, whereas the second flange 19 is constructed approximately in an L-shape. The shorter leg 20 of the L-shaped flange 19 is connected to the other end of the circle segment 17, whereas the longer leg 21 extends in parallel and at a distance from the other linear flange 18. Both flanges 18, 19 are braced by means of at least one clamping screw 22 with respect to one another such that a clamping of the receiving device 11 takes place on the basic member 6.

On the L-shaped flange 19, an internal thread is provided into which a threaded section of the clamping screw 22 can be screwed from the direction of the vehicle occupant compartment. The head 23 of the clamping screw 22 is supported on the other flange 18. The holding elements 7, 8, 9 can be slid in the transverse direction A—A of the vehicle on the basic member 6 and, in addition, can be swivelled around the latter. A holding element such as holding element 9 which when slid in such a manner can be swivelled up into a release position for the installation and the removal of a heater/air conditioner. A center console cross member system of this type can be used for a large number of different vehicles. A transversely extending, profiled rail 24, which receives a loom of cables 25, can also be fixed on the two holding elements 7, 8.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Center console cross member in a motor vehicle, which, aligned in the forward structure at the level of an instrument panel in the transverse direction of the vehicle, is fastened by means of one end respectively on the opposite vehicle body parts of the motor vehicle, the center console cross member comprising a tube-shaped basic member, on which at least one holding element for mounting vehicle function elements, and lateral fastening consoles are mounted,
   wherein at least one holding element and two lateral fastening consoles can be slid onto the basic member of a defined length and can be fixed in an intended use position by clamping fastenings,
   wherein said basic member and said at least one holding element are configured to accommodate both sliding and swivelling movement of the at least one holding element with respect to the basic member.

2. Center console cross member according to claim 1, wherein the at least one holding element includes a first holding element for a steering column.

3. Center console cross member according to claim 2, wherein the at least one holding element includes a second holding element for a front passenger air bag.

4. Center console cross member according to claim 3, wherein the first and the second holding element have identical constructions.

5. Center console cross member according to claim 3, wherein the first and the second holding elements are additionally connected to a vehicle-body-fixed upper cowl cross member and are fastened thereto when in an in use position.

6. Center console cross member according to claim 1, wherein the at least one holding element includes a holding element which can be slid onto the basic member at one end and is connected with its other end to a floor or a longitudinal tunnel of the vehicle body.

7. Center console cross member according to claim 6, wherein the at least one holding element includes a holding element that can be swivelled up into a release position for the installation and the removal of a heater/air conditioner.

8. Center console cross member according to claim 1, wherein the at least one holding element and the fastening consoles each have a transversely extending receiving device which is constructed in one piece with the respective holding elements and the fastening consoles.

9. Center console cross member according to claim 8, wherein the receiving devices provided on the holding elements have locally recessed areas.

10. Center console cross member according to claim 8, wherein each of the receiving devices has a respective circular ring segment surrounding the basic member with flanges extending away from respective ends of the circular ring segment, which flanges extend in areas in parallel and at a narrow distance from one another, and wherein the two flanges are braced with respect to one another by means of at least one clamping screw.

11. Center console cross member according to claim 10, wherein the circular ring segment extends approximately 270° around the basic member.

12. Center console cross member according to claim 10, wherein the flanges include a first linear flange tangentially connected to an end of the circular ring segment and a second flange constructed approximately in an L-shape.

13. A vehicle console cross member assembly which in use extends transversely of a vehicle body and is fastened at respective ends thereof to vehicle body parts, said cross member assembly comprising:
   a tube-shaped basic member,
   a first fastening console detachably attachable to one end of the basic member and serving in use to facilitate fastening of the basic member to a first vehicle body part,
   a second fastening console detachably attachable to an opposite end of the basic member and serving in use to facilitate fastening of the basic member to a second vehicle body part spaced transversely from the first vehicle body part, and
   at least one holding element for holding respective vehicle function elements, said at least one holding element being detachably attachable to the basic member intermediate to the first and second fastening consoles,
   wherein the basic member and the fastening consoles and at least one holding element are configured to facilitate sliding of the fastening consoles and the at least one holding element over and along the basic member while substantially enclosing the basic member, to thereby facilitate fastening of the fastening consoles and the at least one holding element to the basic member at a plurality of respective different use positions; and wherein said basic member and said at least one holding element are configured to accommodate both sliding and swivelling movement of the at least one holding element with respect to the basic member.

14. A vehicle cross member console assembly according to claim 13, wherein the basic member is a cylindrical tube with a constant cross section along at least portions of its length which in use accommodate sliding of the respective fastening consoles and the at least one holding element, and wherein the at least one holding element and the fastening consoles have transversely extending receiving devices which are constructed in one piece with the respective holding elements and the fastening consoles.

15. A vehicle cross member according to claim 14, wherein each receiving device has a circular ring segment surrounding the basic member with flanges extending away from respective ends of the circular ring segment, which flanges extend in areas in parallel and at a narrow distance from one another, and wherein the two flanges are braced with respect to one another by means of at least one clamping screw.

16. A vehicle cross member according to claim 15, wherein the at least one holding element includes a first holding element for a steering column.

17. A vehicle cross member according to claim 16, wherein the at least one holding element includes a second holding element for a front passenger air bag.

18. A vehicle cross-member assembly according to claim 15, wherein the circular ring segment extends approximately 270° around the basic member.

19. A vehicle cross-member assembly according to claim 15, wherein the flanges include a first linear flange tangentially connected to an end of the circular ring segment and a second flange constructed approximately in an L-shape.

20. A method of making a vehicle body assembly comprising:

providing a vehicle body structure including A-columns disposed at opposite lateral sides of a vehicle centerline, forming a tube-shaped basic member, sliding at least one holding element for a vehicle function element over and along the basic member, sliding a pair of fastening consoles over respective opposite ends of the basic member, disposing the basic member with the at least one holding element and the fastening consoles between the A-columns, and fastening the basic member to the A-columns using the fastening consoles; and wherein said basic member and said at least one holding element are configured to accommodate both sliding and swiveling movement of the at least one holding element with respect to the basic member.

21. A method according to claim 20, wherein the basic member is formed as a cylindrical tubular member of constant cross section along at least portions thereof where the holding elements and fastening consoles are to be slidably disposed.

22. A method according to claim 21, wherein the fastening consoles and holding elements each includes a cylindrical recess which in use encloses a major part of the circumference of the basic body clamping flanges extending radially of the cylindrical recesses, and wherein said fastening includes clamping the flanges together by threaded members.

23. A method according to claim 22, wherein the at least one holding element includes a first holding element for a steering column.

24. A method according to claim 23, wherein the at least one holding element includes a second holding element for a front passenger air bag.

25. A method according to claim 20, wherein the at least one holding element includes a holding element which can be slid onto the basic member at one end and is connected with its other end to a floor or a longitudinal tunnel of the vehicle body.

26. A method according to claim 25, wherein the at least one holding element includes a holding element that can be swivelled up into a release position for the installation and the removal of a heater/air conditioner.

27. A method according to claim 20, wherein the at least one holding element includes a holding element that can be swivelled up into a release position for the installation and the removal of a heater/air conditioner.

28. Center console cross member in a motor vehicle, which, aligned in the forward structure at the level of an instrument panel in the transverse direction of the vehicle, is fastened by means of one end respectively on the opposite vehicle body parts of the motor vehicle, the center console cross member comprising a tube-shaped basic member, on which at least one holding element for mounting vehicle function elements, and lateral fastening consoles are mounted, wherein at least one holding element and two lateral fastening consoles can be slid onto the basic member of a defined length and can be fixed in an intended use position by clamping fastenings; and wherein the at least one holding element includes a first holding element for a steering column and a second holding element for a front passenger airbag of identical constructions.

29. Center console cross member in a motor vehicle, which, aligned in the forward structure at the level of an instrument panel in the transverse direction of the vehicle, is fastened by means of one end respectively on the opposite vehicle body parts of the motor vehicle, the center console cross member comprising a tube-shaped basic member, on which at least one holding element for mounting vehicle function elements, and lateral fastening consoles are mounted, wherein at least one holding element and two lateral fastening consoles can be slid onto the basic member of a defined length and can be fixed in an intended use position by clamping fastenings; and wherein the at least one holding element includes a first holding element for a steering column and a second holding element for a front passenger airbag, and wherein the first and second holding elements are additionally connected to a vehicle-body-fixed upper cowl cross member and are fastened thereto when in an in use position.

30. Center console cross member in a motor vehicle, which, aligned in the forward structure at the level of an instrument panel in the transverse direction of the vehicle, is fastened by means of one end respectively on the opposite vehicle body parts of the motor vehicle, the center console cross member comprising a tube-shaped basic member, on which at least one holding element for mounting vehicle function elements, and lateral fastening consoles are mounted, wherein at least one holding element and two lateral fastening consoles can be slid onto the basic member of a defined length and can be fixed in an intended use position by clamping fastenings; and wherein the at least one holding element and the fastening consoles have transversely extending receiving devices which are constructed in one piece with the respective holding elements and the fastening consoles, and wherein each of the receiving devices has a respective circular ring segment surrounding the basic member with flanges extending away from respective ends of the circular ring segment, which flanges extend in areas in parallel and at a narrow distance from one another, and wherein the two flanges are braced with respect to one another by means of at least one clamping screw.

31. A vehicle console cross member assembly which in use extends transversely of a vehicle body and is fastened at respective ends thereof to vehicle body parts, said cross member assembly comprising:

a tube-shaped basic member, a first fastening console detachably attachable to one end of the basic member and serving in use to facilitate fastening of the basic member to a first vehicle body part, a second fastening console detachably attachable to an opposite end of the basic member and serving in use to facilitate fastening of the basic member to a second vehicle body part spaced transversely from the first vehicle body part, and at least one holding element for holding respective vehicle function elements, said at least one holding element being detachably attachable to the basic member intermediate to the first and second fastening consoles, wherein the basic member and the fastening consoles and at least one holding element are configured to facilitate sliding of the fastening consoles and the at least one holding element over and along the basic member while substantially enclosing the basic member, to thereby facilitate fastening of the fastening consoles and the at least one holding element to the basic member at a plurality of respective different use positions;

wherein the basic member is a cylindrical tube with a constant cross section along at least portions of its length which in use accommodate sliding of the respective fastening consoles and the at least one holding element, and wherein the at least one holding element and the fastening consoles have transversely extending receiving devices which are constructed in one piece with the respective holding elements and the fastening consoles; and wherein each of the receiving devices has a respective circular ring segment surrounding the basic member with flanges extending away from respective ends of the circular ring segment, which flanges extend in areas in parallel and at a narrow distance from one another, and wherein the two flanges are braced with respect to one another by means of at least one clamping screw.

32. A vehicle console cross member assembly according to claim 31, wherein the at least one holding element includes a first holding element for a steering column.

33. A vehicle console cross member assembly according to claim 32, wherein the at least one holding element includes a second holding element for a front passenger air bag.

34. A method of making a vehicle body assembly comprising:

providing a vehicle body structure including A-frame body parts disposed at opposite lateral sides of a vehicle centerline, forming a tube-shaped basic member, sliding at least one holding element for a vehicle function element over and along the basic member, sliding a pair of fastening consoles over respective opposite ends of the basic member, disposing the basic member with the at least one holding element and the fastening consoles between the A-frame body parts, and fastening the basic member to the A-frame ports using the fastening consoles, wherein the basic member is formed as a cylindrical tubular member of constant cross section along at least portions thereof where the holding elements and fastening consoles are to be slidably disposed, wherein the fastening consoles and holding elements each includes a cylindrical recess which in use encloses a major part of the circumference of the basic body clamping flanges extending radially of the cylindrical recesses, and wherein said fastening includes clamping the flanges together by threaded members.

35. A method of making a vehicle body assembly according to claim 34, wherein the at least one holding element includes a first holding element for a steering column.

36. A method of making a vehicle body assembly according to claim 35, wherein the at least one holding element includes a second holding element for a front passenger air bag.

* * * * *